(12) United States Patent
Edupalli et al.

(10) Patent No.: US 8,801,240 B2
(45) Date of Patent: Aug. 12, 2014

(54) AIRCRAFT LIGHT

(75) Inventors: Aravind Edupalli, Andhrapradesh (IN); Peter Sterghos, St. Petersburg, FL (US)

(73) Assignee: Goodrich Lighting Systems, Inc., Oldsmar, FL (US)

( * ) Notice: Subject to any disclaimer, the term of this patent is extended or adjusted under 35 U.S.C. 154(b) by 350 days.

(21) Appl. No.: 13/315,532

(22) Filed: Dec. 9, 2011

(65) Prior Publication Data

US 2012/0163007 A1  Jun. 28, 2012

Related U.S. Application Data

(60) Provisional application No. 61/425,924, filed on Dec. 22, 2010.

(30) Foreign Application Priority Data

Jan. 11, 2011  (EP) .................................... 11150591

(51) Int. Cl.
*B64D 47/02* (2006.01)
(52) U.S. Cl.
USPC .......................................... 362/460; 362/470
(58) Field of Classification Search
CPC .. B60Q 1/0425; B60Q 1/0433; B60Q 1/0441; B60Q 1/045; B60Q 1/068; B60Q 1/2626
USPC .................. 362/470, 472, 476, 504, 523, 528
See application file for complete search history.

(56) References Cited

U.S. PATENT DOCUMENTS

| 4,258,414 | A | * | 3/1981 | Sokol | 362/421 |
| 4,884,174 | A | | 11/1989 | Dorleans | |
| 4,954,933 | A | * | 9/1990 | Wassen | 362/514 |
| 5,003,436 | A | * | 3/1991 | Yamada et al. | 362/515 |
| 2003/0016541 | A1 | * | 1/2003 | Kisiel | 362/470 |

FOREIGN PATENT DOCUMENTS

| DE | 19810480 A1 | 9/1999 |
| DE | 20213362 U1 | 10/2002 |

* cited by examiner

*Primary Examiner* — Andrew Coughlin
(74) *Attorney, Agent, or Firm* — Cantor Colburn LLP

(57) ABSTRACT

An aircraft light, particularly for emitting light onto a runway during takeoff or landing and/or onto the ground during taxi, comprises a light source (30), a reflector (12), a support frame (18) for the reflector (12), and an adjustable bearing arrangement (20) including at least two joints (22) pivotably supporting the reflector (12). The adjustable bearing arrangement (20) comprises at least one extendable and retractable adjustment element (24) guided at the support frame (18) along a movement axis (26). At least one of the two joints (22) is formed as a ball-type joint. The ball-type joint (22), to compensate for a change of the distance (A,A') between the at least two joints (22) of the bearing arrangement (20) upon movement of the adjustment elements (24) for tilting the reflector (12), slidably engages the reflector substantially orthogonal to the movement axis (26) of the adjustment element.

4 Claims, 4 Drawing Sheets

AIRCRAFT LIGHT

CROSS REFERENCE TO RELATED APPLICATIONS

This application claims the benefit of an earlier filing date from U.S. Provisional Application Ser. No. 61/425,924 filed Dec. 22, 2010, the entire disclosure of which is incorporated herein by reference.

BACKGROUND OF THE INVENTION

The present invention relates to an aircraft light. More specifically, the present invention relates to a fixed wing aircraft light for emitting light onto the runway during takeoff or landing and/or onto the ground during taxi.

DESCRIPTION OF THE PRIOR ART

Landing and takeoff light units as well as taxi and runway turn off (RTO) light units for aircraft require aim adjustment once in installed on the aircraft for proper light distribution as per legal and technical requirements. A number of known light units are provided with aim adjustment mechanisms using spring mechanisms or other resilient mechanisms. Examples of those aim adjustment mechanisms can be found in CN 2613405Y, EP 0 605 172 B1, DE 10 2005 031 773 A1 and DE 198 10 480 B4. However, aim adjustment mechanisms for aircraft light units using spring mechanisms cannot reduce sufficiently enough the jittering of the light units during takeoff, landing and taxi conditions.

Accordingly, there is a need for an aircraft light which can be used in particular in an aircraft takeoff, landing, taxi and RTO light unit and provides a stable mechanical mount so that it can withstand mechanical vibrations acting on the light unit during operation of the aircraft.

SUMMARY OF THE INVENTION

The present invention is an aircraft light, particularly for emitting light onto the runway during starting or landing and/or onto the ground during taxi. According to an illustrative embodiment, the aircraft light comprises:
  a light source,
  a reflector,
  a support frame for the reflector, and
  an adjustable bearing arrangement including at least two joints pivotably supporting the reflector at the mounting element,
  the adjustable bearing arrangement comprising at least one extendable and retractable adjustment element guided at the support frame along a movement axis,
  at least one of the two joints being formed as a ball-type joint, and
  the ball-type joint is mounted to slidingly engage the reflector along an axis orthogonal to the movement axis of the adjustment element to compensate for a change of the distance between the at least two joints of the bearing arrangement upon movement of the adjustment elements for tilting the reflector, wherein the reflector is capable of being fixedly secured to the adjustment bearing arrangement in a direction substantially orthogonal to the movement axis of the adjustment element.

The adjustable bearing arrangement (aim adjustment mechanism) of the aircraft light according to the invention does not compensate for the change in distance by the use of springs or other resilient or elastic elements for keeping the reflector in its current tilting position relative to the mounting element for the reflector. The adjustable bearing arrangement comprises at least two joints wherein one of these joints is formed as a ball-type joint. Preferably, all the joints are ball-type joints. The sliding engagement of the at least one ball-type joint allows for relative movement between the ball-type joint and the reflector in a direction substantially orthogonal to the movement axis of an adjustment element coupled to the ball-type joint and mechanically engaged with the reflector. The adjustment element is movably guided at the support frame, along a movement axis, out of and into the support frame. The sliding engagement provided by the attachment of the ball-type joint provides compensation for a change of the distance between the joints of the bearing arrangement as the reflector is tilted while maintaining a rigid connection between the joints and the reflector. Accordingly, any jittering of the reflector relative to the support frame can be prevented while allowing aim adjustment using at least one ball-type joint without any spring, resilient or other elastic bearing elements.

In one embodiment of the present invention, the ball-type joint comprises two opposite outer ring elements having concave inner sides, two inner ring elements, respectively arranged adjacent to the outer ring elements and having convex outer sides in abutment with the inner sides of the outer ring elements, and wherein, between said inner disk ring elements, a receiving opening with opening edge is arranged, the receiving opening being formed in the mounting element, which may be part of the reflector or alternatively part of the support frame. The adjustment element extends through the assembly comprising the ring elements, and the receiving opening. The outer and inner ring elements have mating concave inner sides and convex outer sides, respectively, e.g. the outer ring element having a spherical inner surface and the inner ring element having a spherical or conical outer surface, or the outer ring element having a conical inner surface and the inner element having a spherical outer surface forming the mating surfaces of the ball-type joints. The ball-type joint further includes a pair of thrust washers disposed between the inner ring elements. The washers, which may be separate or formed as an integral part of the inner ring elements clamp the mounting element in the region surrounding the receiving opening with sufficient force to hold the mounting element rigidly without vibration, while still allowing sliding engagement between the ball-type joint and the mounting element in a plane substantially orthogonal to the movement axis. Clamping force of the ball-type joint is maintained by means of e.g. lock nuts or other clamping force generating elements.

According to another embodiment, the adjustment element comprises a screw being in threaded engagement with said support frame, the ball-type joint being axially secured to the screw.

In still a further embodiment, the adjustable bearing arrangement comprises three adjustment members arranged at a respective displacement of substantially 120° relative to each other and being guided on the support frame in an extendable and retractable manner along movement axes oriented along a common movement direction, the reflector, via said three ball-type joints, being supported on said adjustment elements in a pivotable manner and with sliding engagement in a direction substantially orthogonal to the direction of the movement axes.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DESCRIPTION OF A PREFERRED EMBODIMENT

Figure 1:
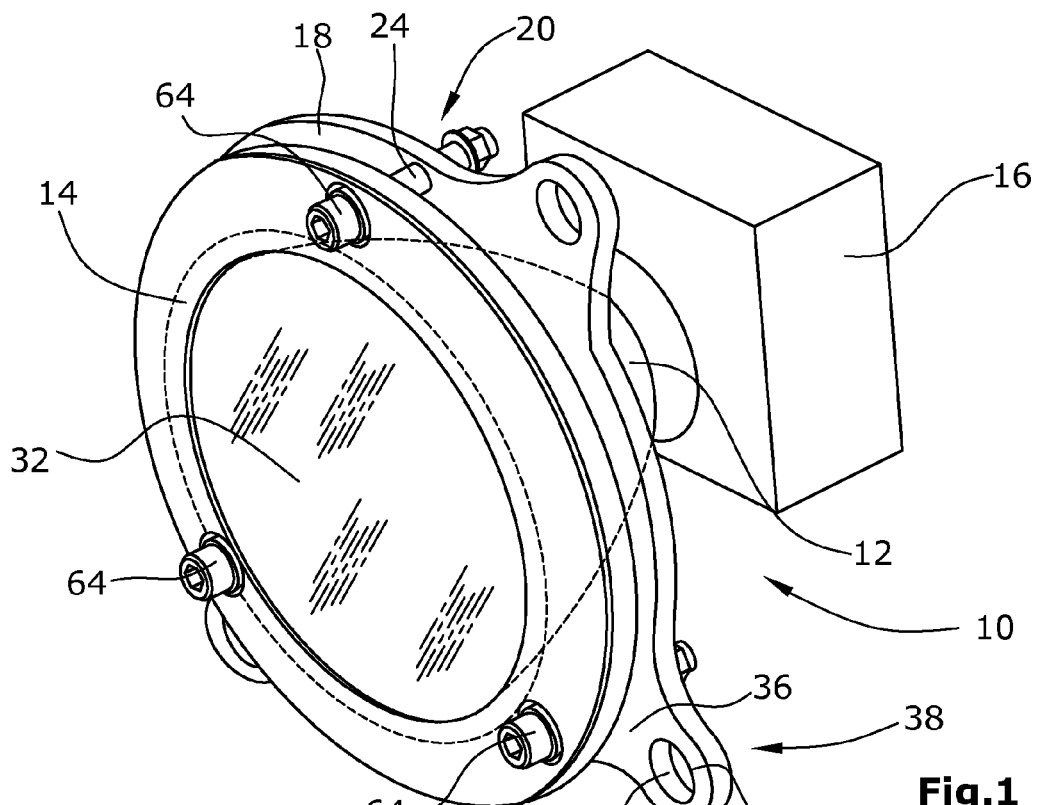
FIG. 1 is an isometric view of an aircraft light for landing, takeoff, runway turn off or taxi provided with the adjustable bearing arrangement according to the present invention.
Figure 2:
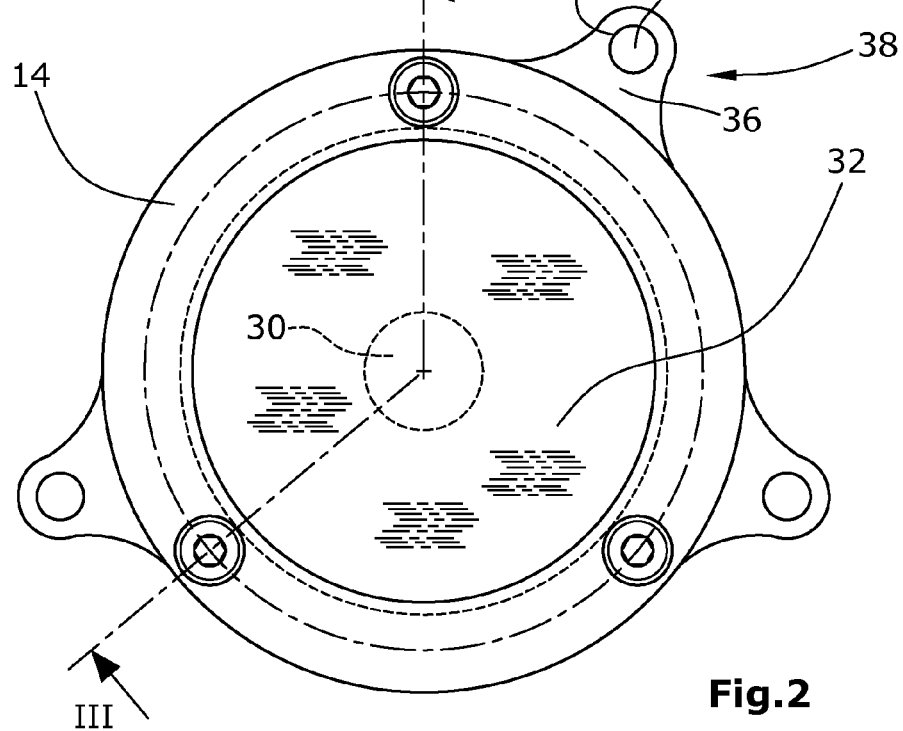
FIG. 2 is a front view of the aircraft light according to FIG. 1.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention. As used herein, unless otherwise specifically defined, the terms "substantially" or "generally" when used with mathematical concepts or measurements mean within ±10 degrees of angle or within 10 percent of the measurement, whichever is greater According to FIG. 1, a landing, takeoff, taxi and/or runway turn off aircraft light unit 10, generally employs a single reflector housing 12 which focuses the light along a central illumination axis and to which a lens or cover retainer subassembly 14 and an igniter housing sub-assembly 16 are attached. The reflector housing 12 itself is adjustably mounted to a support frame 18 which provides an interface component to the aircraft (e.g. to a landing gear or a wing root of the aircraft).

Figure 3:
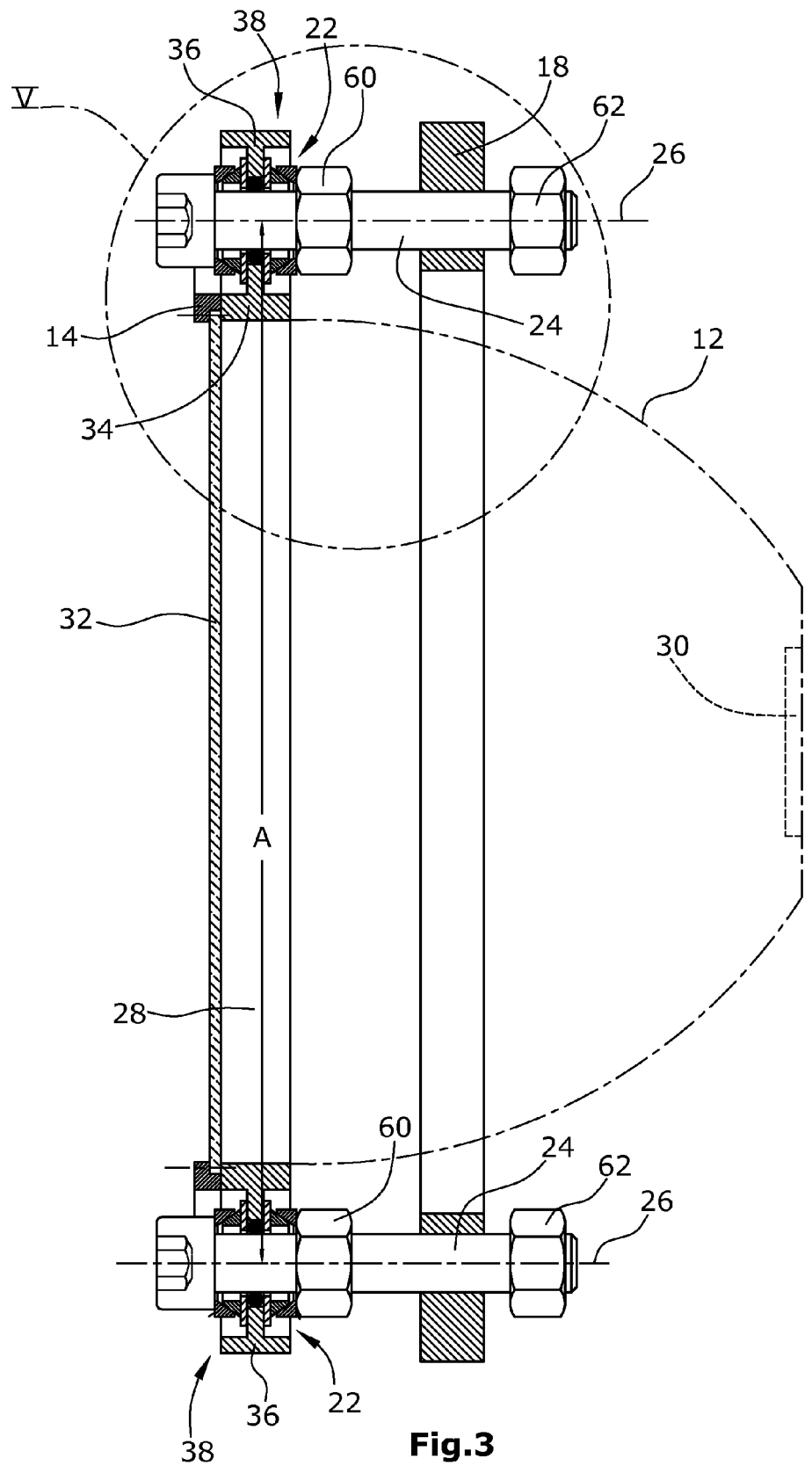
FIG. 3 is a sectional view taken along line III-III of FIG. 2 wherein the reflector housing and holder are arranged in a first orientation of the reflector housing relative to the holding or mounting element of the aircraft light.
Figure 4:
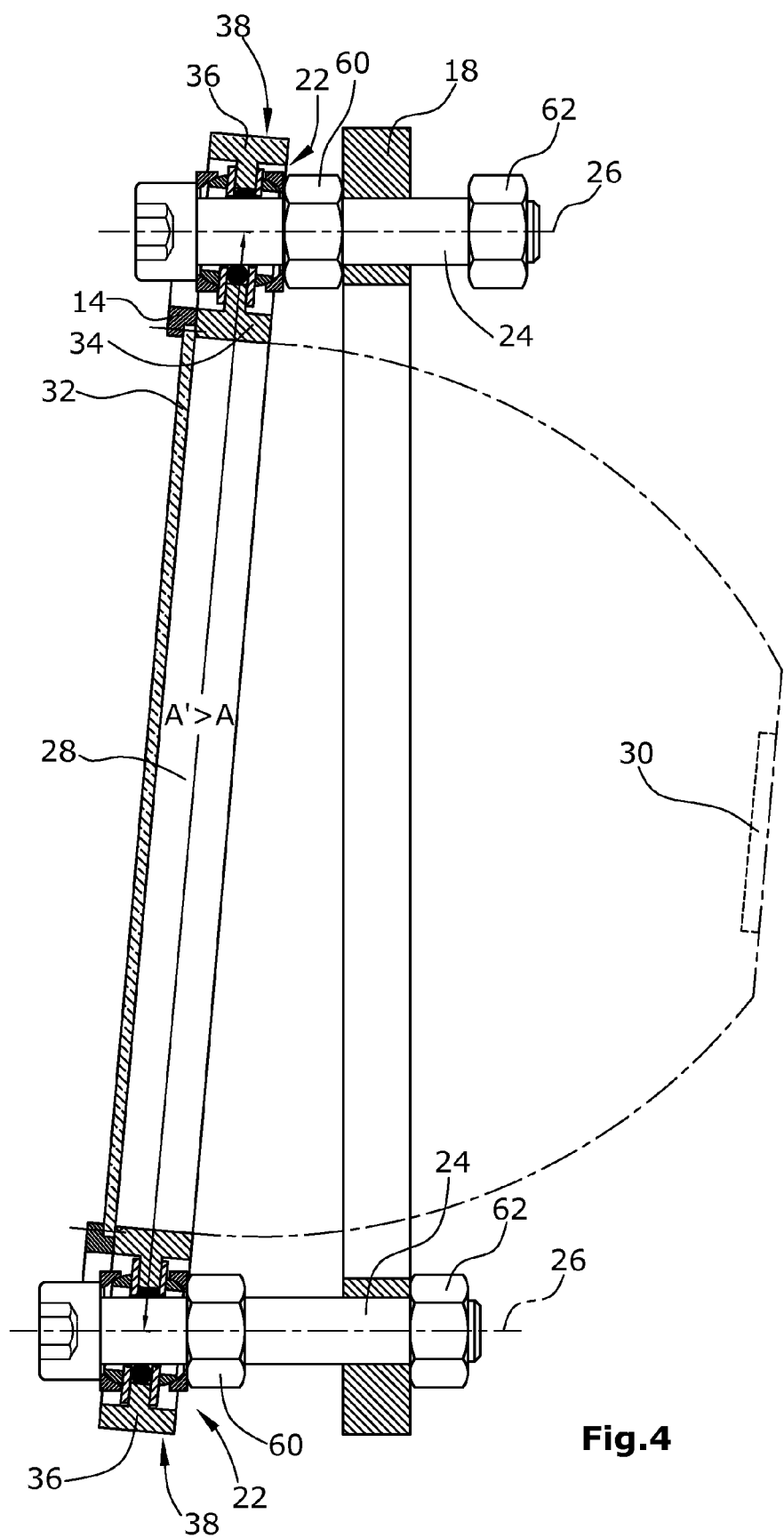
FIG. 4 is also taken along line III-III of FIG. 2 and shows the reflector housing and holder in another orientation of the reflector housing relative to the holding or mounting element of the aircraft light.
Figure 5:
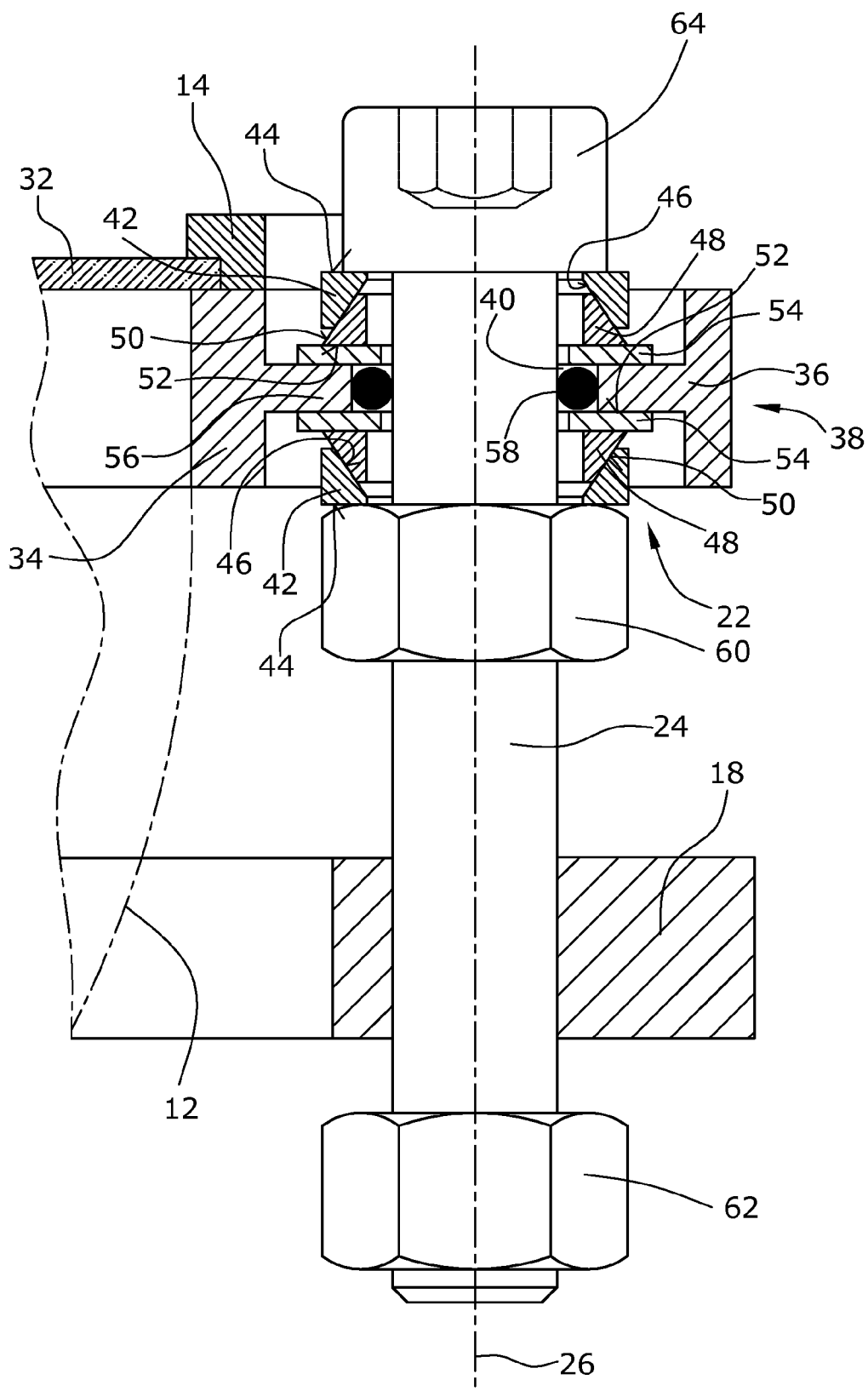
FIG. 5 is a detailed view of the area V of FIG. 3.

The mechanical connection between the support frame 18 and the mounting element, which in the embodiment of FIG. 1 comprises reflector housing 12, carrying the lens retainer sub-assembly 14 is shown e.g. in FIGS. 3 to 5. The mechanical connection is provided by an adjustable bearing arrangement 20 comprising two or more and preferably three ball-type joints 22 arranged at screw-type adjustment elements 24 which are in threaded engagement with support frame 18. The reflector housing 12 is mechanically coupled to the ball-type joints 22 as shown in FIGS. 3 to 5. By moving the adjustment elements 24 along the movement axis 26, the tilting orientation of the reflector housing 12 relative to the support frame 18 can be adjusted. The three ball-type joints 22 are arranged along a circle at steps of substantially 120°.

According to FIG. 3, the lens retainer sub-assembly 14 is located at the light exit opening 28 of the reflector housing 12, through which light exit opening 28 light emitting from a light source 30 will exit from the reflector housing 12. A lens or other transparent cover 32 extends over the light exit opening 28 and is mechanically fixed and fastened by means of an annular insert element 34 mounted to the reflector housing 12. Three tabs 36 or a mounting flange extend(s) radially outwardly from the reflector housing 12 at its light exit opening 28 so as to form joint connecting regions 38 through which the reflector housing 12 is mechanically connected to the three ball-type joints 22. Each of the joint connecting regions 38 are provided with an opening 40 through which an adjustment element 24 extends.

Each ball-type joint 22 comprises two outer spherical ring elements 42 having a flat outer surface 44 and a tapered inner side 46. Adjacent each of the outer ring elements 42, inner ring elements 48 are arranged, having a spherical convex outer side 50 and a flat inner side 52. The two inner ring elements 48 provide the cone-type element of the joint 22 while the outer ring elements 42 form the hollow ball-type receiving space for receiving the ball-type element of the joint 22. Two central thrust washer elements 54 are arranged between the inner spherical ring elements 48 contacting its flat inner surfaces 52. Thrust washer elements 54 may be formed of a metallic material, including the same material as reflector housing 12 to reduce the possibility of galvanic action, or may be formed of various non-metallic materials such as polyethyl ethyl keetone, polyamide-imide or other creep-resistant polymers to reduce the coefficient of friction. Thrust washer elements 54 contact the reveal area 56 extending around and defining the opening 40 within a joint connecting region 38 of the reflector housing 12. The inventive aircraft light includes means for applying a predetermined clamping force between the spherical ball type joints 22 and the reflector housing 12. For example, in the illustrative embodiment the assembly consisting of outer ring elements 42, inner ring elements 48, and thrust washer elements 54 are compressed to a predetermined preload by means of lock nut 60, which preferably comprises an elastic stop nut or other shakeproof fastener. The predetermined preload is a function of the materials and surface finishes of tabs 36 and thrust washers 54 but is generally within a range at or above the minimum force necessary to clamp reflector housing 12 with sufficient force to prevent detectable vibration, but below the force that would prevent thrust washers 54 from slidingly engaging tabs 36. Within the opening 40, an elastic O-ring 58 is located for further bearing and centering purposes.

As will be evident from FIGS. 3 and 4, when rotating the screw adjustment element 24, the tilting orientation of the reflector housing 12 relative to the support frame 18 can be adjusted. When adjusting the reflector housing 12 by moving the adjustment elements 24 along movement axis 26, the distances between the ball-type joints 22 within the plane defined by the reflector housing flange or reflector housing mounting tabs will change. For example, in case of the orientation of the reflector housing 12 according to FIG. 3, this distance A is smaller than the distance A' which is given e.g. if the reflector housing 12 is oriented as shown in FIG. 4.

In order to compensate for these distance changes, the ball-type joints 22 clamp the reveal portion of mounting tabs 36 surrounding openings 40 with sufficient force to prevent rattling but permitting the ball-type joints 22 to slide within openings 40 within the plane defined by the reflector housing mounting flange or mounting tabs 36. This plane is generally substantially perpendicular to the movement axis 26 of the adjustment elements 24. The adjustment elements 24 are provided with first and second lock nuts 60, 62. The first lock nut 60 can be used for clamping together the diverse ring elements of the ball-type joints 22 in order to fix the reflector housing 12 relative to the adjusting element 24 and to fix the clamping force between ball-type joints 22 and their respective mounting tabs 36, while both the first and second lock nuts 60 and 62 limit the movement of each adjustment element 24 along its movement axis 26. Via an operating portion

64 (screw or nut head 64), the adjustment element 24 can be turned by a tool (screw driver, pliers or the like).

According to the above description of an embodiment of an aircraft light unit, the approach according to the invention does not utilize springs or other resilient or elastic elements to compensate for tolerances and relative motions of the reflector housing 12 and the support frame 18 through the angle adjustment range of motion. Although O-ring 58 is an elastic element, it is not the primary mechanism by which the invention compensates for the change in distance. Instead, the primary mechanism is the sliding engagement between the ball-type joints and the openings 40. This results in a jitter-free light performance which is accomplished without inducing any significant forces or associated stresses in the assembly. The approach according to the invention also offers an advantage over the light unit design which would incorporate a large single ball-type joint on the central access of the light unit by eliminating any large areas of contact where wear and water entrapment could occur. It is also a weight-efficient approach. The aim adjustment mechanism used according to the invention, provides both a rigid aim mechanism once the light unit is adjusted to its target and avoids jittering effects while allowing for both rotational and translational ability to the reflector housing relative to the connecting or mounting element within the provided constraints without stressing the components involved in the mechanism.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. For example, although in the illustrative embodiment, the mounting elements that are slidingly engaged by the ball-type joints comprised the reflector housing, the mounting element could comprise corresponding openings in the support frame 18 or could comprise a flange on the adjustment element 24 that is clamped by the ball-type joint to permit lateral movement about the axis of adjustment element 24. Additionally, instead of three ball-type joints, the adjustable bearing arrangement of the aim adjustment mechanism according to the invention can also be provided with more than three or only one or two ball-type joints. Depending on the number and relative position of the ball-type joints, the reflector housing can be tilted along more or less axis in space. Also, instead of screw-type adjustment elements 24, other designs for these adjustment elements can be used. For example, rods or other adjustment elements without threaded engagement with the mounting element can be used wherein it has to be safeguarded that the adjustment elements can be secured against undesired movements along their respective axes relative to the mounting element. It is therefore intended to include within the invention all such variations and modifications as fall within the scope of the appended claims and equivalents thereof.

What is claimed is:

1. An aircraft light comprising:
   a light source;
   a reflector housing;
   a support frame;
   a light aiming assembly connecting said reflector housing to said support frame, said light aiming assembly comprising a plurality of adjustment elements extending between said support frame and said reflector housing, each of said plurality of adjustment elements including a joint pivotally supporting said reflector housing, at least one of said plurality of adjustment elements being movable along a movement axis;
   at least one of said joints being formed as a ball-type joint, said ball-type joint including a clamping portion that slidingly engages said reflector housing along a plane substantially orthogonal to the movement axis of said adjustment element;
   means for applying a predetermined clamping force between the clamping portion of said ball-type joint and said reflector housing; wherein said ball-type joint comprises two opposed outer ring elements having concave inner sides, two inner ring elements respectively arranged adjacent to said outer ring elements and having convex outer sides in abutment with the inner sides of said outer ring elements, and a receiving opening arranged between said inner ring elements, wherein said adjustment element extends through an assembly comprising said ring elements and said receiving opening;
   wherein said ball-type joint comprises two opposed outer ring elements having concave inner sides, two inner ring elements respectively arranged adjacent to said outer ring elements and having convex outer sides in abutment with the inner sides of said outer ring elements, and a receiving opening arranged between said inner ring elements, wherein said adjustment element extends through an assembly comprising said ring elements and said receiving opening; and
   two thrust washer elements dispose between and adjacent to said inner ring elements.

2. The aircraft light of claim 1, wherein:
   the predetermined clamping force is below that which would prevent sliding engagement between the clamping portion of said ball-type joint and said reflector housing.

3. The aircraft light of claim 1, wherein said adjustment element comprises a screw having a threaded engagement with said support frame and said ball-type joint is axially secured to said screw.

4. The aircraft light of claim 1, wherein said light aiming assembly comprises three adjustment elements arranged at a respective displacement radially disposed along an arc distal of a central illumination axis of said light source and disposed substantially 120° relative to each other, said adjustment elements being guided on a support frame in an extendable and retractable manner along movement axes oriented along a common movement direction, said reflector housing, via said three ball-type joints, being supported on said adjustment elements in a tiltable manner with sliding engagement between said ball-type joints and said mounting element, the sliding engagement being in a direction substantially orthogonal to the direction of said movement axes.

* * * * *